INVENTOR.
G. F. BLOXHAM
BY a.c. Schwarz, Jr.
ATTORNEY

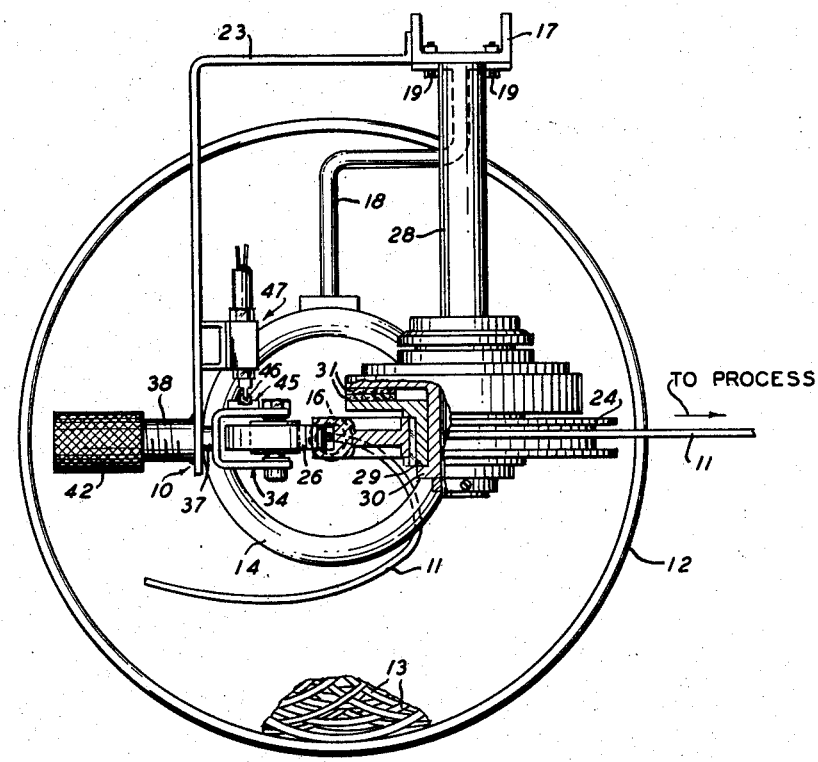
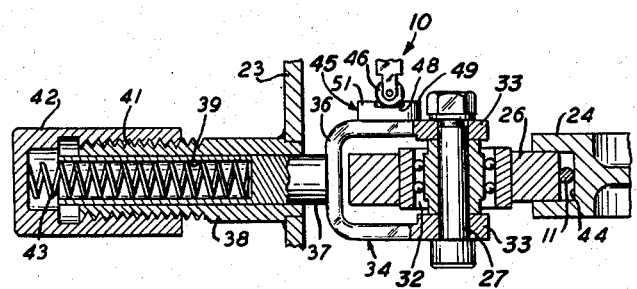
FIG. 2
FIG. 3
INVENTOR.
G. F. BLOXHAM

United States Patent Office 2,913,828
Patented Nov. 24, 1959

2,913,828

APPARATUS FOR DETECTING VARIATIONS IN THE DIAMETER OF AN ADVANCING STRAND

Gordon F. Bloxham, Baltimore, Md., assignor to Western Electric Company, Incorporated, New York, N.Y., a corporation of New York Application March 4, 1958, Serial No. 719,164

2 Claims. (Cl. 33—143)

The present invention relates to apparatus for detecting variations in the diameter of an advancing strand, and more particularly to apparatus for detecting diameter variations in excess of preselected tolerance limits.

In the manufacture of communications cable and cords, it is necessary to perform a succession of manufacturing operations involving running lengths of strand material of one type or another. For example, copper rods are drawn and annealed into copper wire of suitable gage, plastic or other insulating material is extruded or otherwise applied as insulation about the copper wire, a number of the insulated wires are twisted or stranded together to form cable or cord cores, and insulating or other covering material is applied about the cores to form finished lengths of cable or cordage.

Between most of the several manufacturing operations, such as those listed above, a relatively long length of the strand produced in one operation is taken up, for example, by winding the strand on a take-up reel or by distributing the strand in loops into a take-up barrel. The take-up member, such as the reel or barrel, is then transported to another location and the strand is withdrawn therefrom as feed or supply to a subsequent strand-working operation.

In many strand-working operations, it is desired to detect and discard strand material being fed to the process having diameter variations in excess of preselected tolerance limits. For example, in the manufacture of one-quarter inch nominal diameter, polyvinyl chloride insulated, telephone cordage, it may be necessary to discard all cordage having thickened portions of a diameter greater than five-sixteenths of an inch or thin portions of a diameter less than three-sixteenths of an inch. Thus, the tolerance limits in this case are plus or minus one-sixteenth of an inch, based on the nominal diameter. In a previous manufacturing or take-up operation, the strand may have been kinked, snarled or knotted, presenting a diameter greater than the pre-selected maximum diameter. Also, the strand may be broken or stripped, presenting too small a diameter. It is desired to detect all of the above conditions and to discard the strand or correct the faulty strand condition.

An object, therefore, of the invention is to provide new and improved apparatus for detecting variations in the diameter of the advancing strand.

Another object of the invention is to provide new and improved apparatus for detecting diameter variations in excess of preselected tolerance limits.

An apparatus for detecting variations in the diameter of an advancing strand, embodying certain features of the invention, may include a pair of guide pulleys arranged so that the strand advances between the peripheries thereof, in combination with means for resiliently biasing the pulleys toward each other. The biasing means is designed so that the peripheries of the pulleys continuously contact the advancing strand, whereby the pulleys are spaced apart a distance proportional to the diameter of the strand advancing therebetween. Further, means are provided, responsive to the spacing between the pulleys, for detecting diameter variations in excess of preselected tolerance limits.

More particularly, one of the guide pulleys may be rotatably mounted between the arms of a movable U-shaped support member, which is spring-biased toward the axis of the companion pulley. The spring-biased pulley is preferably formed with a square periphery as viewed in transverse cross section designed to fit reciprocably within a substantially square groove as viewed in transverse cross section formed in the periphery of the companion pulley, the mating peripheries serving to retain the strand therebetween. The detecting means may comprise a camming surface carried by the movable U-shaped support member, coacting with a cam roller designed to operate a microswitch for controlling the operation of the strand advancing means.

Other objects and advantages of the invention will appear from the following detailed description of a specific embodiment thereof, when read in conjunction with the appended drawings, in which:

Fig. 2 is a plan view of the apparatus illustrated in Fig. 1, with portions broken away to reveal structural details, and Fig. 3 is an enlarged, horizontal section, taken substantially along the line 3—3 of Fig. 1 in the direction of the arrows, illustrating particularly the diameter-detecting apparatus of the invention.

Figure 1:
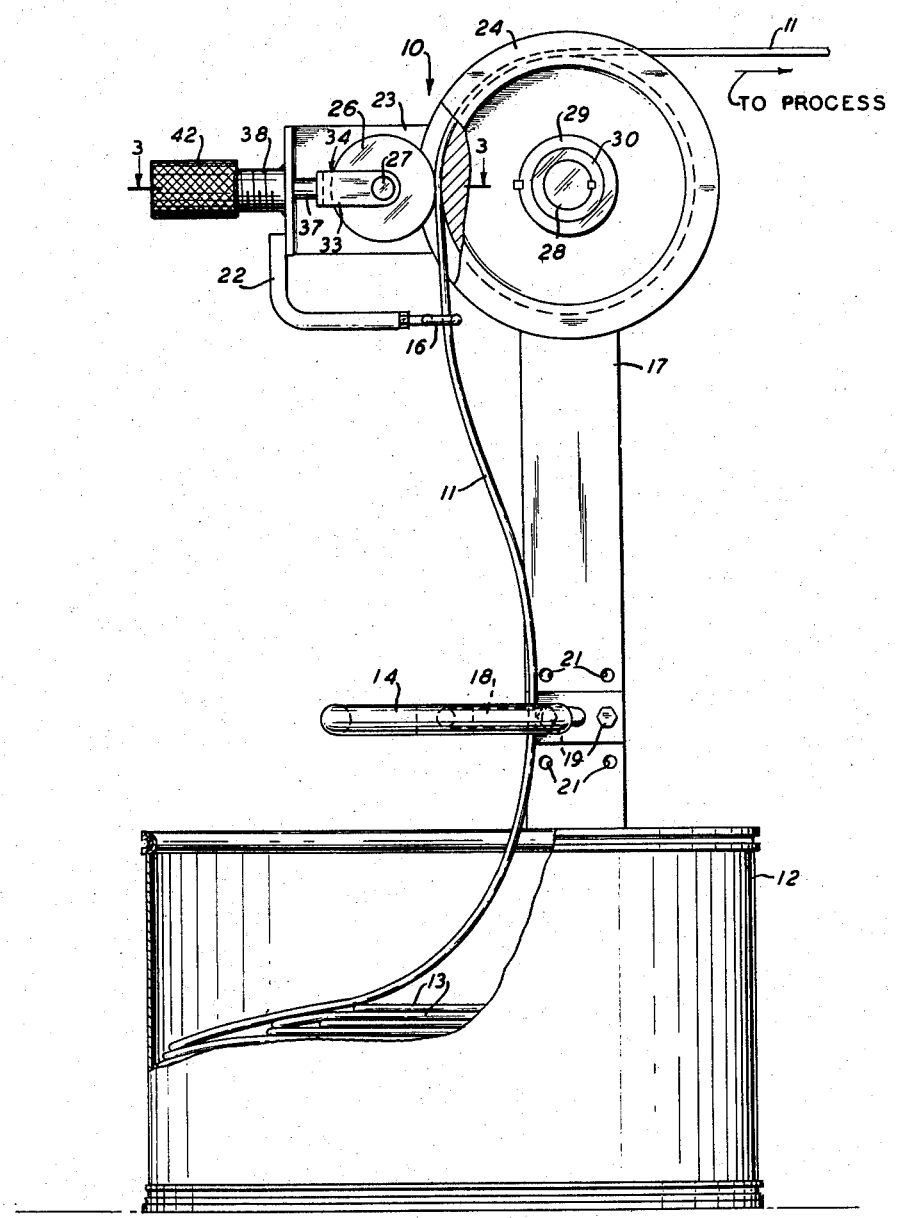
Fig. 1 is a front elevation of apparatus embodying the invention, with portions broken away to reveal structural details.

Referring now in detail to the drawings and in particular to Figs. 1 and 2, the diameter-detecting apparatus, designated generally by the numeral 10, is shown in conjunction with one type of strand supplying apparatus with which it may be used. Using this apparatus, a strand 11 is advanced from a source of supply, through the diameter-detecting apparatus 10, to a particular strand-working operation (not shown but designated generally by the legend "To Process") by any suitable advancing means such as a conventional capstan (not shown).

It should be understood that the advancing means may operate continuously, as in a continuous insulation operation, or may operate intermittently to withdraw relatively short lengths of strand, as in a cutting and coiling operation for finished telephone cordage. In the latter type of operation, a predetermined length of the cordage is advanced from the source of supply, through the detector 10, to a cutting and coiling machine, whereupon the advancing means is stopped and the predetermined length of cordage is cut, the ends thereof are stripped, and then the cut and stripped cord is coiled and removed from the machine. At this time, the advancing mechanism operates again to supply another length of cordage to the machine.

The source of supply is shown as a barrel 12 containing a number of strand loops 13, 13, coiled loosely therein for ready withdrawal therefrom. It should be realized that the strand supply might also be a take-up reel or any other strand-retaining device capable of paying out a supply of the strand material. Also, it will be understood that a pair of such devices might be arranged for continuous supply by connecting the trailing end of one operative supply source to the leading end of an adjacent, standby source. When the operative source becomes depleted, the connection between the strands of the two sources permits the standby source to become the operative source, without interrupting the supply.

When using the barrel supply 12, it is convenient to provide a relatively large, circular guide member or eyelet 14 positioned a short distance above the barrel 12 and a relatively small, circular guide member or eyelet 16 positioned a short distance below the diameter-detecting apparatus 10. The eyelets 14 and 16 are preferably aligned coaxially above the center of the barrel 12, and the strand 11 is threaded therethrough, being guided thereby as it advances to the detecting apparatus 10. If a pair of supply barrels, such as the barrel 12 shown, are used to provide continuous operation, the two barrels are positioned on opposite sides of the center line between the eyelets 14 and 16, and the strand 11 may advance from either barrel through the large eyelet 14, being guided thereby toward the small eyelet 16 and the detector 10.

The eyelets 14 and 16 are supported at appropriate heights on a main support column 17. The lower eyelet 14 is shown secured to one end of a supporting arm 18, the other end of which is secured to the column 17 by a pair of bolts 19—19, which are received within any of a number of pairs of aligned apertures 21—21 formed at appropriate heights along the column 17. The height of the eyelet 14 above the barrel 12 may be adjusted to accommodate supply barrels of different sizes by securing the bolts 19—19 within a desired pair of the apertures 21—21. The upper eyelet 16 is secured to a supporting arm 22, which depends from a supporting bracket 23 extending from the column 17.

The diameter-variation detecting device 10 comprises generally a pair of rotatable guide pulleys 24 and 26 carried by the main support column 17 with their peripheries in alignment, as best seen in the enlarged sectional view (Fig. 3), so that the strand 11 may advance therebetween. As shown in Fig. 1, the strand 11 advances upward from the barrel 12, being guided by the aligned eyelets 14 and 16, passes between the two guide pulleys 24 and 26 in contact with the opposing peripheries thereof, continues engagement with the periphery of the pulley 24 for approximately one-quarter circle, from whence it is withdrawn by the advancing mechanism and fed into the particular manufacturing process.

The pulleys 24 and 26 are both rotatable so that the strand 11 may be advanced therebetween, the pulleys being rotated by their contact with the strand. In the embodiment shown, the pulley 26 is mounted for free rotation about a non-rotating but linearly movable horizontal shaft 27, whereas the pulley 24 is a tensioning pulley mounted for constrained or braked rotation about a horizontal shaft 28. The constrained or braked rotation may be accomplished by any suitable frictional device, such as a clutch or brake, or by other rotation impeding means such as an electromagnetic clutch.

One type of braking member suitable in the practice of the invention is shown in Fig. 2, wherein the tensioning pulley 24 is keyed to an outer sleeve 29, which is rotatable about an inner sleeve 30. The inner sleeve 30 is keyed to the fixed shaft 28 and has an outer bearing surface about which the sleeve 29 may rotate. The sleeves 29 and 30 are secured, one to each of a pair of engaged friction discs 31—31. The engaging surfaces of the discs 31—31 are lined with frictional material and the degree of braking is controlled by adjusting the pressure of the engagement.

The purpose of the braking means is to tension the strand extending between the pulley 24 and the capstan or other advancing means. It will be understood that the pulley 24 could be freely rotatable in accordance with the invention; however the tensioning connection shown is particularly convenient, since it enables the pulley 24 to serve the double function of forming a part of the diameter-detecting apparatus 10 while at the same time applying a desired tension to the strand 11.

Means are provided for resiliently biasing the two guide pulleys 24 and 26 toward each other, designed so that the peripheries of the pulleys continuously contact the advancing strand, whereby the pulleys are spaced apart a distance proportional to the diameter of the strand advancing therebetween. In the embodiment shown, this is accomplished by mounting the tensioning pulley 24 for rotation about the fixed horizontal shaft 28 and mounting the idler pulley 26 for rotation about a substantially parallel but linearly movable shaft 27.

As illustrated in Fig. 2, the tensioning pulley 24 and its associated braking apparatus is mounted cantilever-fashion at one end of the fixed horizontal supporting shaft 28. The other end of the shaft 28 is secured to and projects from the supporting column 17. Thus, the pulley 24 is rotatable, against the action of the friction discs 31—31, about a fixed horizontal axis, the strand 11 advancing in contact with about one-quarter circle of the periphery thereof, being tensioned thereby, as it advances to the process.

As best seen in Fig. 3, the pulley 26 is mounted for free rotation about the horizontal shaft 27 by means of suitable bearings 32 inserted therebetween. The ends of the shaft 27 are supported between opposing arms 33—33 of a generally U-shaped support member or clevis, designated generally by the numeral 34. The arms 33—33 are longer than the radius of the pulley 26 mounted therebetween, so that pulley 26 may rotate freely without contacting the base portion 36 of the clevis 34.

A horizontally extending rod 37 is secured to the base 36 of the clevis 34 and supports the idler pulley assembly. The rod 37 is supported slidably within a sleeve 38 secured to the support bracket 23. The sleeve is so located with respect to the position of the tensioning pulley 24 that the idler pulley 26 is supported thereby with its periphery in alignment with that of the tensioning pulley 24, as best seen in Fig. 3.

The inner surface of the supporting sleeve 38 is made of bearing material to provide a sliding fit with the outer surface of the rod 37. The rod 37 is formed with a partial bore 39 extending from the end remote from the supported clevis 34. The sleeve 38 is formed with an externally threaded end portion 41, designed to receive an internally threaded end cap 42 thereon.

A biasing spring 43 is inserted in the space between the cap end 42 and the bottom of the partial bore 39, for resiliently urging the idler pulley 26 toward the tensioning pulley 24. The position of the end cap 42 on the threaded portion 41 of the sleeve 38 may be adjusted to regulate the biasing force exerted by the spring 43 on the idler pulley 26. This adjustment should allow the idler pulley 26 to ride relatively freely upon the strand 11 advancing between the two pulleys, permitting movement of the pulley 26 to the right or left, as viewed in Fig. 3, in accordance with the diameter of the strand. The biasing force must be maintained below the point at which the strand 11 advancing between the two pulleys will be damaged due to excessive pressure.

The periphery of one of the pulleys is formed with a substantially square channel or groove 44 as viewed in transverse cross section, as shown with respect to the tensioning pulley 24 in Fig. 3, the strand 11 advancing in contact with any point along the flat bottom of the groove 44. The other pulley, idler pulley 26 in the example shown, is formed with a substantially square profile or periphery, as viewed in transverse cross section in Fig. 3, along which the strand 11 advances. The pulley 26 is formed with its square profile slightly thinner than the width of the square groove 44 so that it may fit slidably therewithin. With this design, a closed, rectangular recess is defined between the two pulleys 24 and 26, which serves to confine the strand 11 and prevent it from slipping from between the pulleys, yet the idler pulley 26 may reciprocate freely within the groove 44 in accordance with the diameter of the strand advancing between the opposing peripheries of the two pulleys.

In conjunction with the resiliently biased pulleys, means are provided, responsive to the spacing between the pulleys, for detecting diameter variations in excess of preselected tolerance limits. In the apparatus shown herein, the detecting means are designed to be responsive to predetermined variations in the position of the resiliently biased, idler pulley 26 as it moves toward or away from the fixed-axis, tensioning pulley 24 in accordance with the diameter of the strand 11 advancing therebetween.

A preferred, position-responsive detecting apparatus is best seen in Fig. 3, and includes a camming bar, designated generally by the numeral 45, secured to the upper arm 33 of the clevis 34. A cam roller 46, associated with a switch 47 (Fig. 2), is designed to ride upon the surface of the camming bar 45. The surface of the camming bar 45 is so shaped that when the diameter of the strand 11 is within the desired tolerance limits of its nominal value, the cam roller 46 will ride at one level, operating the switch 47 to a first position indicative of the nominal diameter. At other diameters, the camming bar 45 is designed to move the roller 46 to other levels, operating the switch 47 to other positions indicative of faulty strand.

*Operation*

In the operation of the embodiment of the invention illustrated in the drawings, the advancing mechanism (not shown) pulls the strand 11 from the supply barrel 12, through the guide eyelets 14 and 16, between the fitting, aligned peripheries of the two pulleys 24 and 26, around the tensioning pulley 24, which applies a tensioning force to the strand, and then through the particular manufacturing process. The idler pulley 26 is resiliently biased by the spring 43 toward the tensioning pulley 24 so that it floats or rides on the advancing strand 11 and is spaced from the tensioning pulley 24 a distance proportional to the diameter of the strand 11 advancing therebetween.

For example, if the nominal diameter of the strand 11 is one-quarter of an inch, and the advancing strand 11 has that diameter, the idler pulley 26 rides substantially one-quarter of an inch from the bottom of the groove 44 of the tensioning pulley 24, and the supporting structure including the clevis 34 and the camming bar 45 assumes the position illustrated in Fig. 3. The surface of the camming bar 45 is designed so that, at this diameter, the cam roller 46 rides in the center of a recessed portion 48, formed in the camming bar 45. In this position, the switch 47 is operated to its first position, corresponding to an advancing strand of the desired diameter.

Conveniently, the switch 47 may be electrically connected in a well-known manner in the energization circuit for the strand-advancing mechanism (not shown) so that when the cam roller 46 rides in the recessed portion 48, the advancing mechanism is energized to advance the strand to the process. Obviously, this position of the switch 47 may be electrically connected to operate any other indicating means or to operate any desired process equipment.

The recessed portion 48 is formed of such length that the switch 47 will remain in the "on" position as long as the strand diameter is within the preselected tolerance limits. For example, this portion may be shaped so that, when the diameter of the strand 11 is no more than one-sixteenth of an inch larger or smaller than the nominal diameter of one-quarter of an inch, the cam roller 46 is retained therein and the switch 47 remains in its "on" position.

In the event that the advancing strand 11 has a diameter larger than the upper tolerance limit of five-sixteenths of an inch, such as a thickened portion or a kink or knot, the oversize strand will force the idler pulley 26 to the left, as viewed in Fig. 3, against the action of the biasing spring 43. At this time, the camming bar 45 moves to the left with the pulley 26 to present to the cam roller 46 a raised end portion 49, formed at the right of the recessed central portion 48.

The raised end portion 49 forces the cam roller 46 upwardly, as viewed in Fig. 3, to change the position of the associated switch 47 to indicate faulty strand. If the switch 47 is merely an "on-off" switch disposed in the energization circuit of the advancing mechanism, the energization circuit is now broken to stop the advancement of the strand 11. When the strand 11 is stopped in this manner, the faulty portion will lie in the length of strand extending between the tensioning pulley 24 and the process. The fault may readily be located and either corrected or cut out and discarded. Obviously, the switch 47 could operate in other manners, such as by closing a second contact to signal oversize strand.

In the event that the advancing strand 11 has a diameter smaller than the lower tolerance limit of three-sixteenths of an inch, such as a thin, stripped or broken portion, the idler pulley 26 will be moved to the right, as viewed in Fig. 3, by the biasing spring 43 to present to the cam roller 46 a second raised portion 51 of the camming bar 45, formed at the left of the recessed central portion 48. In the example shown, this also operates to open the switch 47 to shut off the advancing mechanism to discontinue the advancement. If the strand 11 is completely broken, or if for any other reason there is no strand advancing between the pulleys 24 and 26, the pulley 26 will be moved into contact with the pulley 24 to indicate a fault in the same manner that undersize strand is indicated.

While the camming bar 45 has been shown as having a recessed central portion 48, corresponding to the nominal strand diameter, and raised end portions 49 and 51, corresponding to strand diameters greater and less than the preselected tolerance limits of the nominal diameter, it should be realized that the camming bar need only be so shaped as to constrain the roller 46 to operate the switch 47 to one position when one diameter of strand to be identified is advanced between the peripheries of the two pulleys and to another position when a different diameter of strand is advanced therebetween. For example, it would be possible to provide a camming surface having three distinct elevations controlling a three-position switch, such that one position would indicate correct diameter strand and the other two positions would indicate oversize and undersize strand, respectively.

It will be manifest that this invention is not limited to the specific details described in connection with the above embodiment of the invention, but that various modifications may be made without departing from the spirit and scope thereof.

What is claimed is:

1. Apparatus for detecting variations in the diameter of an advancing strand, which comprises a first pulley mounted for rotation about a fixed axis and having a substantially square-grooved periphery as viewed in transverse cross section, a second pulley having a substantially square periphery as viewed in transverse cross section designed to fit slidably within the square groove of said first pulley, a movable support for rotatably mounting said second pulley so that its square periphery fits within the square groove of said first pulley, the strand advancing therebetween, means engaging said movable support for resiliently urging said second pulley toward said first pulley so that the peripheries of said pulleys continuously contact the advancing strand, whereby said second pulley moves on its support toward and away from said first pulley in accordance with changes in the diameter of the strand advancing therebetween, a switch, a cam roller for actuating said switch, and a camming bar carried by said movable support and engaging said cam roller, said camming bar having central portion of one elevation which engages said cam roller when the advancing strand has a diameter within preselected tolerance limits of its nominal diameter to operate said switch to a first position indicating a strand diameter within the tolerance limits, said camming bar also having end portions of different elevations than the central portions to change the position of said switch to indicate diameter variations greater and less than the preselected tolerance limits.

2. Apparatus for detecting variations in the diameter of an advancing strand, which comprises a main support, a sleeve secured to said main support and having an externally threaded end, a supporting rod having a partial bore in one end slidably received within said sleeve with its bored end adjacent to the threaded end of said sleeve, a U-shaped support member secured at its base to the unbored end of said supporting rod, a shaft mounted between the arms of said U-shaped support member, a first pulley having a square periphery as viewed in transverse cross section mounted for free rotation about said shaft, a second pulley mounted on said main support for rotation about a fixed axis in spaced parallel alignment with the axis of said first pulley, said second pulley having a square-grooved periphery as viewed in transverse cross section designed to receive slidably the square periphery of said first pulley, said pulleys being spaced so that the strand is advanced between the peripheries thereof, an end cap received on the threaded end of said sleeve, a biasing spring received between said end cap and the bottom of the partial bore in said supporting rod for resiliently urging said first pulley toward said second pulley so that said first pulley moves with its support toward and away from said second pulley in accordance with changes in the diameter of the strand passing therebetween, a switch, a cam roller for actuating said switch, and a camming bar secured to one of the arms of said U-shaped support and engaging said cam roller, said camming bar having a recessed central portion which engages said cam roller when the advancing strand has a diameter within preselected tolerance limits of its nominal diameter to operate said switch to a first position indicating a strand diameter within the tolerance limits, said camming bar also having raised end portions which engage said cam roller when the advancing strand has a diameter greater or less than the preselected tolerance limits to operate said switch to a different position indicating the passage of an oversized or undersized strand.

References Cited in the file of this patent

UNITED STATES PATENTS

| | | |
|---|---|---|
| 549,444 | Dailey | Nov. 5, 1895 |
| 2,433,585 | Warner | Dec. 30, 1947 |